UNITED STATES PATENT OFFICE.

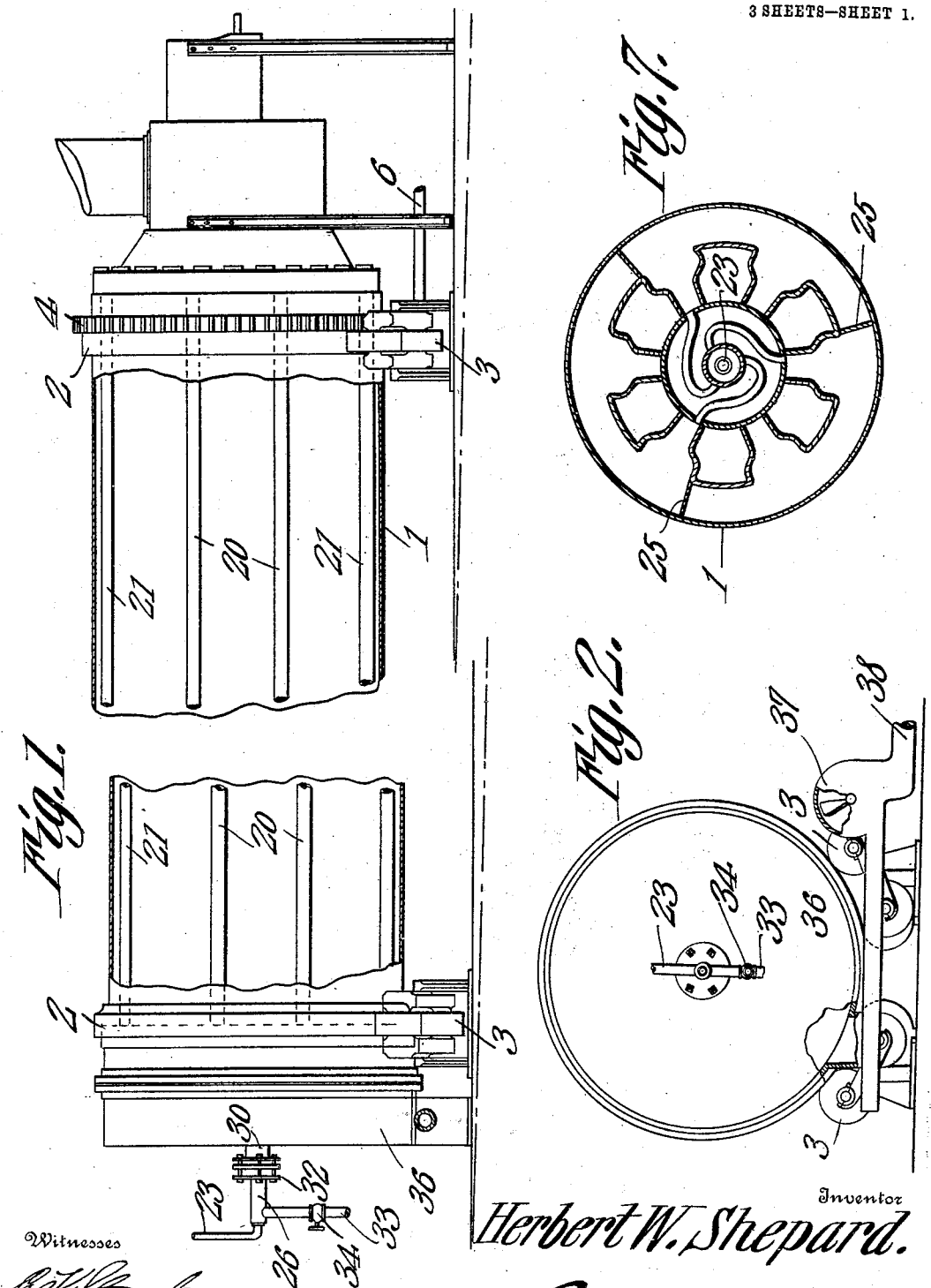

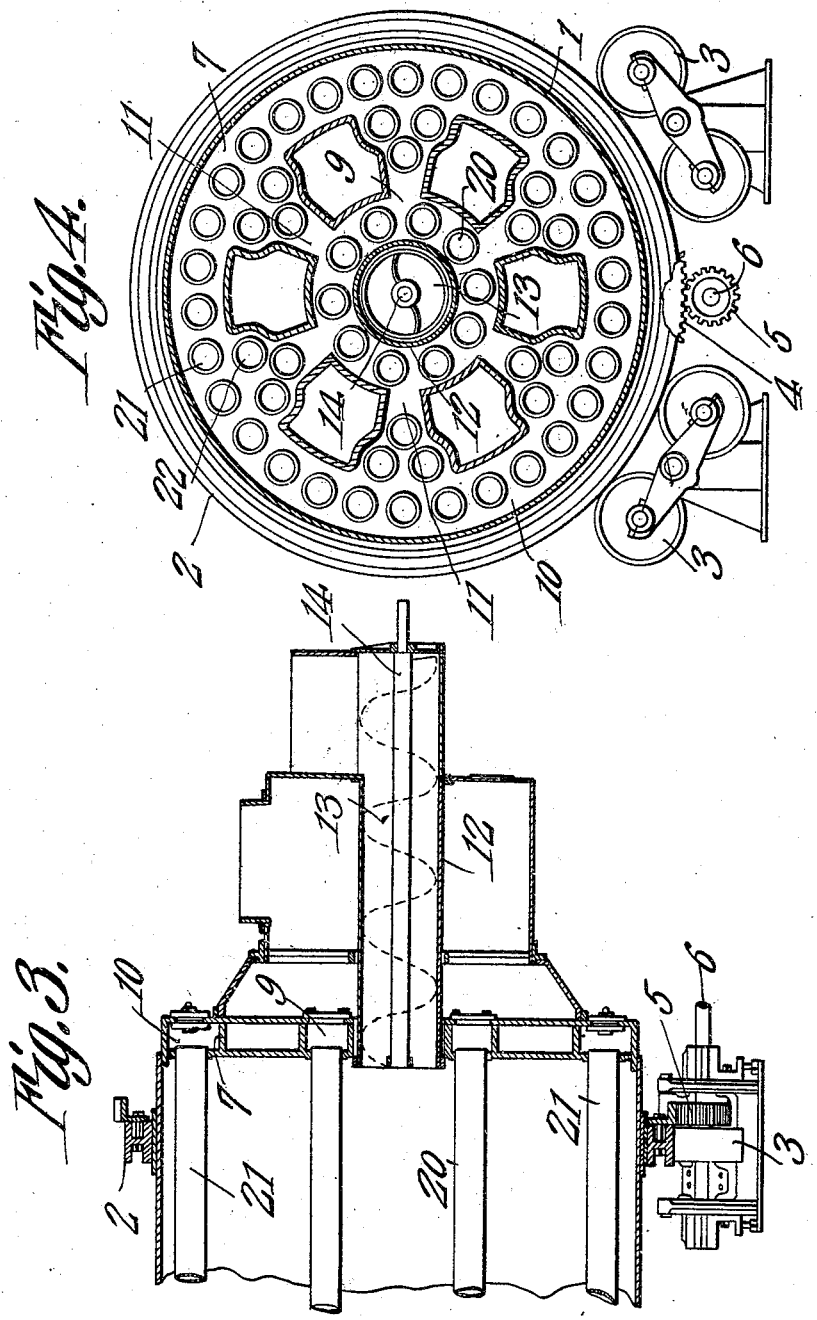

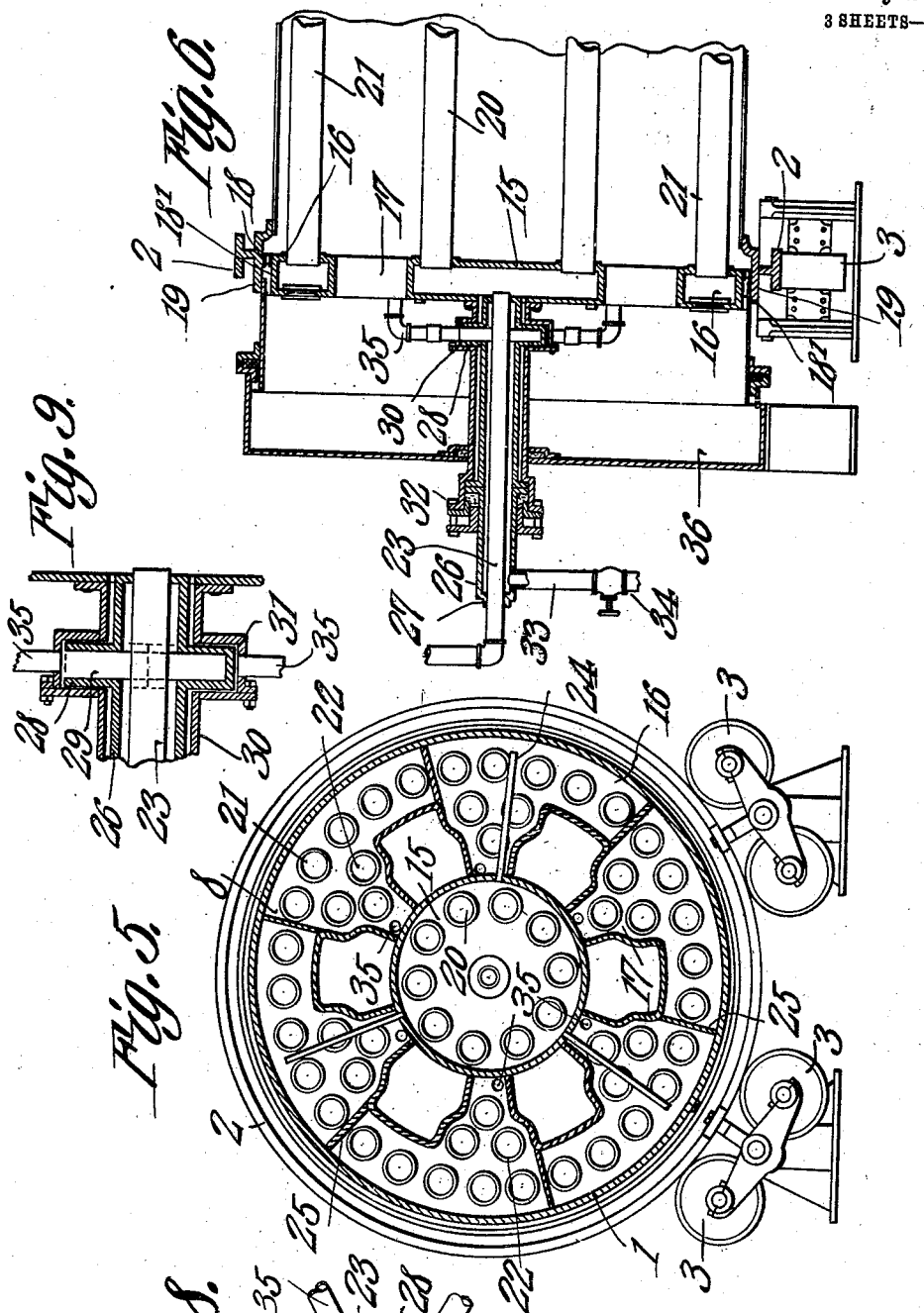

HERBERT W. SHEPARD, OF NEW YORK, N. Y.

DRIER.

No. 928,706.     Specification of Letters Patent.     Patented July 20, 1909.

Application filed February 20, 1909. Serial No. 479,098.

*To all whom it may concern:*

Be it known that I, HERBERT W. SHEPARD, a citizen of the United States, residing at New York city, in the county of New York and State of New York, have invented a new and useful Drier, of which the following is a specification.

This invention has reference to improvements in driers more especially of the rotary type employing steam heated pipes as the source of heat for drying any granular substance but especially for brewers' and distillers' use.

The particular class of drier to which the present invention relates is that in which there is provided a drying cylinder with hollow or chambered heads at the ends which heads are usually termed "manifolds" and between these heads or manifolds there extend numerous steam pipes, there usually being a central or axial group of pipes at one end of which the live steam enters and is conducted to the other end where it discharges into the corresponding manifold, and there also being a peripheral series of steam pipes through which the steam after passing through the central series of pipes and into the more remote head or manifold returns to the first head or manifold and from this latter point the steam is discharged through a suitable exhaust.

The material to be dried is fed into the drying cylinder through the end remote from the steam inlet end of the cylinder and because of the inclined axis of the cylinder it is slowly fed toward the other or discharge end for the material to be dried. In the passage through the drier the material is lifted continuously by the peripheral series of pipes and falls through the heated zone within the drier, to be again lifted numerous times during its travel from one end to the other of the drier and so is thoroughly subjected to the drying action of the hot atmosphere within the drier.

The general structure to which the present invention relates does not differ materially from that of driers already in commercial use, but such use has developed certain defects which it is the object of the present invention to overcome.

The present invention comprises more especially means for feeding the material to be dried into the drying chamber or cylinder through the manifold remote from the steam end of the drier and which may be termed the receiving end of the drier since it is at this end the material to be dried is fed into the drier, and the invention also provides means whereby condensed steam at the exit end of the drier, which corresponds to the steam inlet to the drier, is expeditiously disposed of.

The invention will be best understood from a consideration of the following detail description taken in connection with the accompanying drawings forming a part of this specification, in which drawings, Figure 1 is an elevation partly in section of a drier constructed in accordance with the present invention. Fig. 2 is an elevation of the discharge end of the drier. Fig. 3 is a vertical longitudinal section through the feed end of the drier. Fig. 4 is a vertical cross section through the manifold at the feed end of the drier looking toward the discharge end thereof. Fig. 5 is a similar section through the manifold at the discharge end of the drier looking toward the feed end thereof. Fig. 6 is a central longitudinal section through the drier at the discharge end thereof, and which also constitutes the steam inlet end. Fig. 7 is a partially structural diagram of the discharge end of the drier showing a means for disposing of the water of condensation. Figs. 8 and 9 are cross and longitudinal sections, respectively, of the means for preventing the water of condensation on its way to the exhaust from reaching the manifold at the corresponding end of the drier.

Referring to the drawings there is shown a drum 1 formed at each end with circular or peripheral tracks 2 running on suitably disposed supporting rollers 3 in a manner common to structures of this character and therefore needing no particular description. At the feed end the drum is elevated to a greater extent than at the discharge end so that the axis of rotation of the drum is inclined to the horizontal. At the feed end there is formed a peripheral rack 4 engaged by a gear 5 on a shaft 6 to which latter power may be applied for causing a rotative movement of the drum.

At the feed end of the drum there is provided a manifold 7 and at the discharge end of the drum there is provided a manifold 8. The manifold 7 is made up of a central hollow annulus 9 and a peripheral hollow annulus 10 connected by hollow spokes 11 so that there is free communication between the annulus 9 and the annulus 10 through said spokes 11. The manifold 7 is built into or secured fast to the drum 1 so as to rotate therewith.

Entering the interior of the drum through the axis thereof and terminating at the inner edge of the annulus 9 is a conveyer shell 12 in which is mounted a conveyer 13, the flights of which substantially fill the shell 12 and the shaft 14 of which may be rotated by power applied in any suitable manner. The conveyer 13 terminates at the inner face of the annulus 9 and there discharges directly into the interior of the drum 1. It will be observed from Fig. 4 that the spokes 11 expand from the annulus 9 toward the annulus 10.

The manifold 8 comprises a central circular drum 15 and a peripheral annulus 16 joined to the drum but not in communication therewith by hollow spokes 17 expanding from the drum to the point of connection with the annulus 16. The manifold 8 is not secured to the drum 1 but is provided exterior to the annulus 16 with a flange 18 engaging the inner wall of a short runway 19 extending around the drum interior to the respective track 2 at this end of the drum and permitting a limited movement of the manifold 8 in a direction longitudinal to the drum.

Extending from the drum 15 to the annulus 9 and connecting the two is a circular series of pipes 20 and extending from and connecting the annulus 16 to the annulus 10 is another circular series of pipes 21 concentric with the pipes 20 while connecting the wider portions of the spokes of the two manifolds 7 and 8 are other pipes 22.

It is the usual custom to make the manifold 8 fixed in the drum or cylinder 1 and as the parts are of course assembled cold it has been found that the alternate heating and cooling of the drum and the expansion and contraction of the pipes connecting the two manifolds ultimately causes a loosening of the pipe at the joints and even the destruction of the apparatus. By mounting the manifold 8 so as to slide in the direction of the length of the drum 1, the expansion of the pipe connecting the two manifolds is compensated for and no strain is brought upon the connections of the pipes with the manifolds and consequently the life of the apparatus is largely prolonged.

Steam is introduced into the drum 15 in the axis of rotation thereof by means of a pipe 23 which, however, does not participate in the rotative movement of the drum. The steam on entering the drum 15 passes to the pipes 20 and through the latter to the annulus 9 thence out through the spokes 11 to the annulus 10 and returns by way of the pipes 21 and 22 to the spokes and peripheral portion of the manifold 8 where the steam becomes condensed and the water condensation escapes in a manner to be described.

The drum 15 is not in communication with the annulus 16 through the spokes 17 since the peripheral wall of the drum 15 is solid or unbroken where connected to the spokes 17. However, there are a few radial pipes 24 of small diameter leading from the drum 15 to near the outer wall of the annulus 16. These serve to drain the drum 15 from any water of condensation which may become lodged therein, such water of condensation escaping into the annulus 16. The said annulus 16 is divided into a number of compartments or pockets by radial walls or diaphragms 25 constituting continuations of one wall of each spoke 17.

Surrounding the steam pipe 23 is a sleeve 26 spaced a distance from said pipe but at each end having inturned flanges 27 secured to said pipe. At a point somewhat removed from the discharge end of the steam pipe 23 but still within the drum 1 the sleeve 26 is expanded into a drum 28 having the upper portion of its peripheral wall removed to form an opening 29 into said drum. Surrounding the sleeve 26 is another sleeve 30 in close relation to the sleeve 26 but still spaced a slight distance therefrom so as not to touch the sleeve 26. The sleeve 30 is also expanded into a drum 31 exterior to and concentric with the drum 28 but still slightly spaced therefrom. The outer wall of this drum is intact and completely incloses the drum 28 and also closes in the cut-away portion forming the opening 29 in the drum 28. One end of the sleeve 30 beyond the drum 31 is connected to and opens into the drum 15 while the other end of the drum 30 is secured to the corresponding end of a drum 1. Surrounding the drum 26 at the point of exit from the corresponding head of the drum 1, the said drum 26 extending to the exterior of the drum 1, is a gland 32 so that the drum 26 may remain stationary, and the drum 30 may rotate about the same without danger of leakage where one passes through the other. Leading from the sleeve 26 exterior to the drum 1 is a discharge pipe 33 which may include a suitable check valve 34. The inner end of each spoke 17 is connected by a pipe 35 to the drum expansion 31 of the sleeve 30.

Any water of condensation forming in the pockets of the manifold 8 exterior to the drum 15, will, when the drum 1 revolves, ultimately gravitate to the inner ends of the spokes 17 and will there find escape through the corresponding pipe 35 to its point of connection with the expansion 31 of the sleeve 30. When the spoke is above the horizontal then with this pipe 35 is carried into coincidence with the opening 29 in the drum 28 of the sleeve 26 and any water finding its way through the pipe 35 will fall into the drum 28 and ultimately find its way through the sleeve 26 to the exhaust pipe 33 through which it will be discharged. The fit between the sleeves 26 and 30 while not mechanically tight is so close as to prevent any material leak of steam while the water of condensation can by no possibility escape from the drum 28 except through the sleeve 26 and only through that in a direction toward the exhaust pipe 33.

It has been proposed to lead the pipes 35 directly through the sleeve 30 in coincidence with an opening in the sleeve 26, but because of the small diameter of the sleeve 26 the water striking the pipe 23 is splashed to such an extent as to find its way through the small space between the sleeves 26 and 30 and ultimately into the drum 15 from which latter it is desirable to keep water of condensation so far as possible. This objectionable feature may be prevented to a marked extent by the arrangement of the pipes 35 in the manner shown in Fig. 7 where it will be observed that the pipes are carried around the sleeve 30 so as to no longer enter the same in a line radial to the axis of the sleeve 30 which line will coincide with the radial line of the spoke from which the pipe 35 leads. By this arrangement water of condensation flowing from a spoke 17 will not enter the sleeve 26 directly above the pipe but to one side thereof so that the splashing, heretofore found an objectionable feature, is avoided.

It will be observed that longitudinal movement of the manifold 8 may be provided for by permitting a corresponding longitudinal movement of the sleeve 30 through the end of the drum with the sleeve 26 participating in this movement.

The discharge end of the drier empties into a conduit 36 at one side of the vertical longitudinal plane of the drier and this conduit leads to a suction fan 37, the other end of the conduit being open to cause the creation of a strong draft through said conduit. From the fan 37 the dried material may be delivered to another conduit 38 from which the dried material may be disposed in any suitable manner.

What is claimed is:—

1. In a rotary steam drier, a manifold having an inner live steam receiving drum or compartment, and outer compartments separate from the inner compartment and designed to receive the steam after having passed through the drier, and pipes leading from the inner compartment through and opening into the outer compartments near their outer portions.

2. In a rotary steam drier, a manifold, having an inner drum or compartment for receiving live steam, outer pockets or compartments for receiving steam after passing through the drier, a steam supply pipe entering the inner drum of the manifold, a sleeve encircling the pipe, steam connections between the outer pockets or compartments in the manifold and the sleeve surrounding the steam pipe, and means for preventing water entering the sleeve by the pipe connections from being splashed out of said sleeve and reaching the inner drum of the manifold.

3. In a rotary steam drier, a manifold having an inner drum or compartment for receiving live steam, outer pockets or compartments for receiving steam after passing through the drier, a steam supply pipe entering the inner drum of the manifold, a sleeve encircling the steam pipe and provided with a radially expanded portion open on top, another sleeve surrounding the first sleeve and provided with a radially expanded portion housing the like portion of the first named sleeve, and pipe connections between the outer pockets or compartments of the manifold and the expanded portion of the second named sleeve.

4. In a rotary steam drier, a manifold having an inner drum or compartment for receiving live steam, outer pockets or compartments for receiving steam after passing through the drier, pipes leading from the inner drum and opening into the outer pockets or compartments near the periphery thereof, a steam supply pipe entering the inner drum of the manifold, a sleeve encircling the steam pipe and provided with a radially expanded portion open on top, another sleeve surrounding the first sleeve and provided with a radially expanded portion housing the like portion of the first named sleeve, and pipe connections between the outer pockets or compartments of the manifold and the expanded portion of the second named sleeve.

In testimony that I claim the foregoing as my own, I have hereto affixed my signature in the presence of two witnesses.

HERBERT W. SHEPARD.

Witnesses:
   JAS. M. WARDER,
   E. HUME TALBERT.